United States Patent [19]
Thierbach

[11] Patent Number: 4,493,029
[45] Date of Patent: Jan. 8, 1985

[54] MICROPROCESSOR WITH PLA ADAPTED TO IMPLEMENT SUBROUTINES

[75] Inventor: Mark E. Thierbach, Lincroft, N.J.

[73] Assignee: AT&T Bell Laboratories, Murray Hill, N.J.

[21] Appl. No.: 378,403

[22] Filed: May 14, 1982

[51] Int. Cl.³ .............................................. G06F 9/22
[52] U.S. Cl. .................................................. 364/200
[58] Field of Search ............... 364/200, 900 MS Files

[56] References Cited

U.S. PATENT DOCUMENTS

| Re. 31,287 | 6/1983 | Patil | 340/825.03 X |
| 4,218,770 | 8/1980 | Weller | 371/61 X |
| 4,241,402 | 12/1980 | Mayper, Jr. et al. | 364/200 |
| 4,399,516 | 8/1983 | Blahut et al. | 364/900 X |

OTHER PUBLICATIONS

Introduction to VLSI Systems, by Carver Mead and Lynn Conway, Addison-Wesley, 1980.

Primary Examiner—Thomas M. Heckler
Attorney, Agent, or Firm—Herbert M. Shapiro

[57] ABSTRACT

A microprocessor includes a programmable logic array (PLA) adapted to allow "subroutines" or sequences within the PLA. The subroutines can be used by more than one opcode with a return performed to the opcode after execution of the subroutine.

8 Claims, 4 Drawing Figures

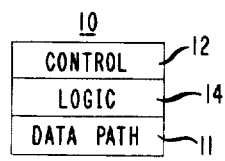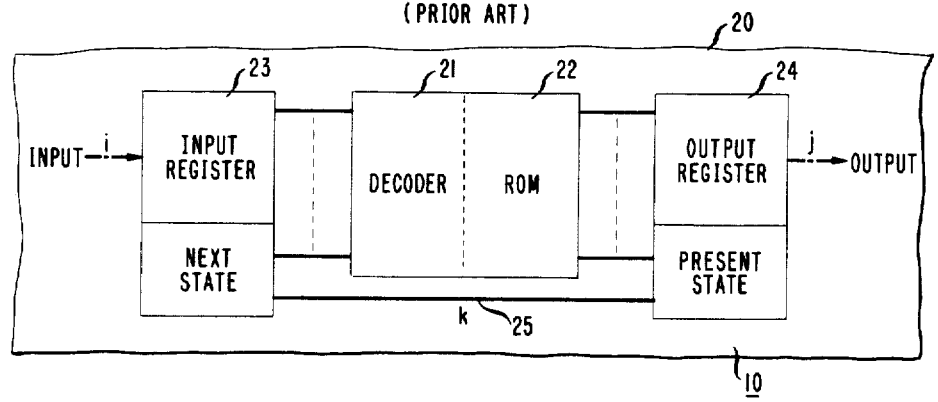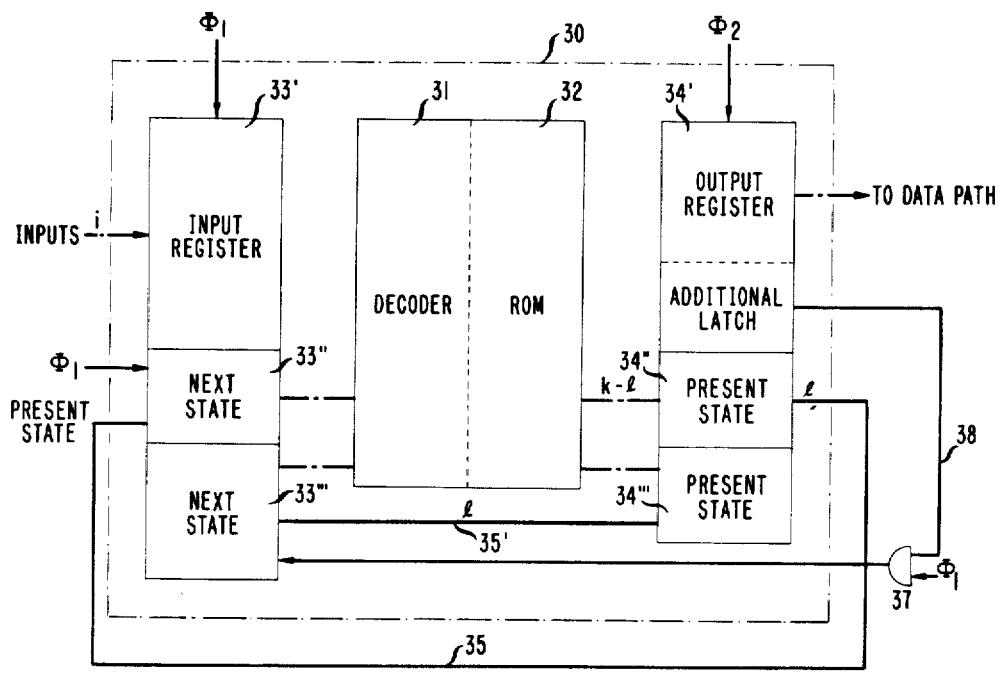

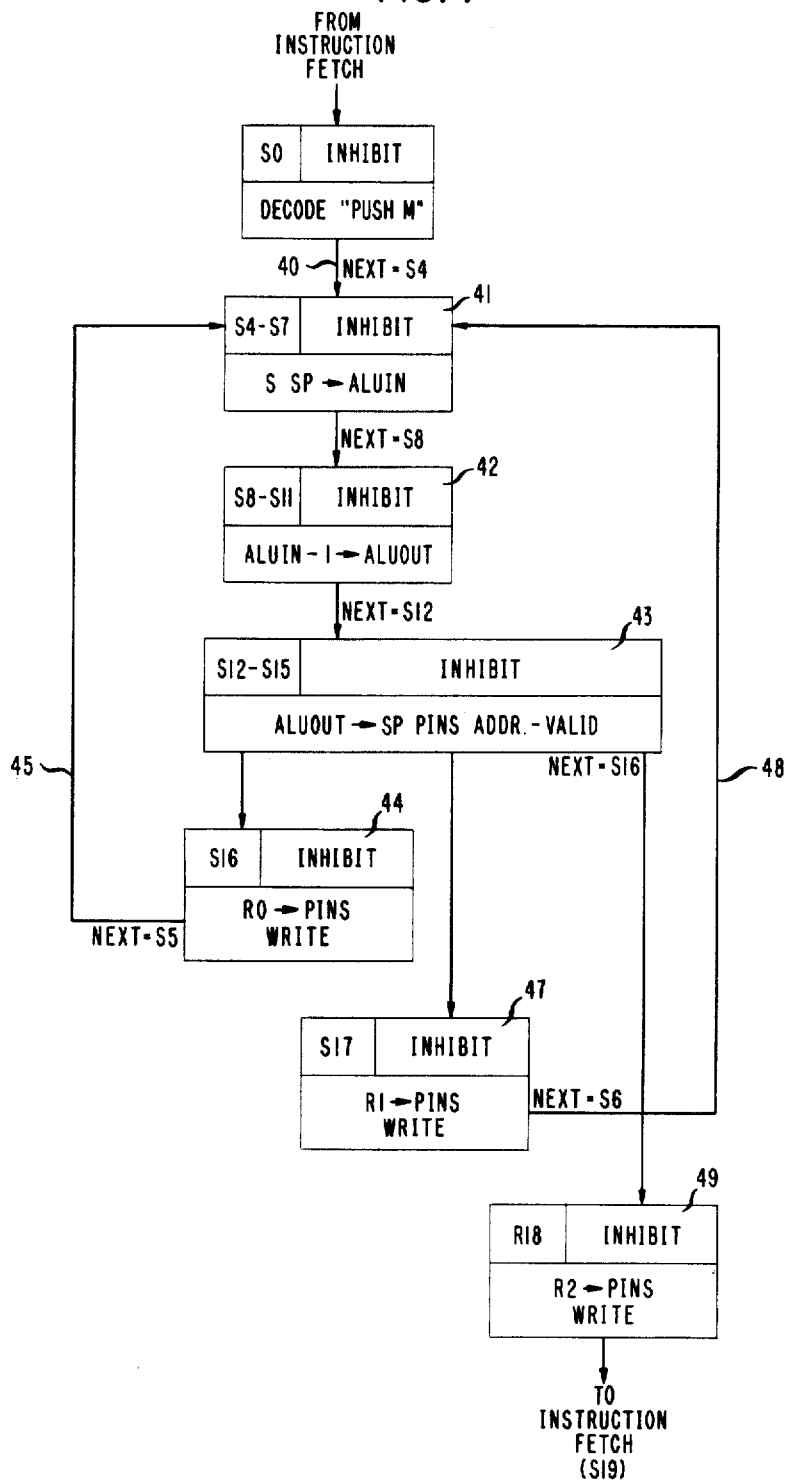

४,४९३,०२९

MICROPROCESSOR WITH PLA ADAPTED TO IMPLEMENT SUBROUTINES

FIELD OF THE INVENTION

This invention relates to finite state machines and, more particularly, to microprocessors employing Programmed Logic Arrays (PLA's) to generate microcode for controlling data path operations.

BACKGROUND OF THE INVENTION

Microprocessors are defined in a single chip of semiconductor material as is well known in the art. A microprocessor includes a data path in which processing is carried out and a control section to generate the microcode which controls the various elements of the data path. The control section often includes one or more programmed logic arrays (PLA's) which respond to sequences of input commands (opcodes) to generate the outputs or microcode.

A PLA includes a decoder portion and a read only memory (ROM) portion. Input and output registers are connected to the decoder and to the ROM portions, respectively. A PLA usually also contains a feedback path between the output register and the input register. A PLA thus is responsive not only to opcodes but also to bits, in the feedback loop, which define the present state of the PLA and determine the next consecutive state in cooperation with a next consecutive opcode. In this manner, a finite state machine is realized.

A PLA includes a separate implementation (line of microcode) for each command (input) in its repertoire. Specifically, each distinct set or subset of inputs, to which a PLA is capable of responding, requires a separate path in the decoder and ROM portions. The resultant set of outputs, in any particular case, may be distinct or the same as those for one or more other sets of inputs.

Frequently, sequences of outputs are needed in response to more than one set of inputs as, for example, in an instruction fetch operation. In prior art PLA's, the sequences of outputs have to be implemented in each path for each distinct set or subset of inputs. The problem is that such redundant implementation of these sequences is wasteful of chip area.

BRIEF DESCRIPTION OF THE INVENTION

A PLA in accordance with the present invention includes a ROM in which each commonly used sequence of outputs is coded just once and a call mechanism is provided to allow the sequence to be used in response to any one of a number of distinct sets or subsets of inputs. The call mechanism provides for exiting from a sequence without providing a word line in the PLA for each possible exiting path by providing a "return address" or a state to return to after completion of the sequence.

The call mechanism includes a modification of the familiar feedback path characteristic of the classical PLA-based state machine structure. Such a modified feedback path typically includes the conventional present state latches and next state latches. But an additional output latch is included. When this additional latch is activated it is operative to inhibit the updating of (a subset of) the next state latches. In the absence of an "inhibit" signal from this additional latch, the next state latches are updated on each cycle of machine operation in the traditional manner. The additional latch thus cooperates with the next state latches to allow the PLA to use a portion of the present state to represent the "return address" for shared sequences of outputs.

BRIEF DESCRIPTION OF THE DRAWINGS

FIG. 1 is a schematic representation of a semiconductor microprocessor chip;

FIG. 2 is a block diagram of the structure of a classical state machine implemented with a PLA;

FIG. 3 is a block diagram of the structure of a state machine implemented with a PLA structured to implement subroutines in accordance with this invention; and FIG. 4 is a sample state diagram fragment which illustrates the use of a subroutine call mechanism in the PLA of FIG. 3.

DETAILED DESCRIPTION

FIG. 1 shows a semiconductor chip 10 in which a microprocessor is defined by familiar semiconductor processing techniques. Such chips and the techniques for making such chips are discussed in "Introduction to VLSI Systems", by Carver Mead and Lynn Conway, Addison-Wesley Publishing Co., Inc., 1980.

A microprocessor includes a data path section 11, including such elements as, for example, a Stack Pointer (SP) and an Arithmetic Logic Unit (ALU), . . . , etc. (not shown), in which data is processed, and a control section 12 which orchestrates the manner in which the elements of the data path cooperate to process the data. Signals from the control section are applied to familiar BUS structures via logic circuitry represented by a logic section 14 of the chip.

The control portion of the microprocessor typically includes a programmed logic array (PLA) 20 which responds to coded inputs (commands) to provide one or more microcode words (outputs) for manipulating the elements of the data path. As is clear from FIG. 2, the PLA includes a decoder portion 21, a ROM portion 22 and input and output registers 23 and 24, respectively, as is well known. Inputs are applied to the input register and outputs appear at the output registers during first and second phases of operation as is also well understood.

A feedback path 25 (of say k bits) characterizes a finite state machine. Outputs of the PLA are applied to the path during the second phase of operation, $\phi_2$, for inputting to the input register 23 during a first phase, $\phi_1$, of operation. The PLA thus is operative to determine a Next State (NS) sequence of outputs in addition to a Present State (PS) in response to an input to register 23.

FIG. 3 shows a PLA 30 also including a decoder section, a ROM section, and input and output registers 31, 32, 33 and 34, respectively. Registers 33 and 34 are divided into portions 33', 33" and 33''', and 34', 34" and 34''', respectively. Portion 34' of output register 34 includes an Additional Latch (AL). PLA 30 includes a feedback path 35 as was the case in the prior art arrangement of FIG. 2. In the case of FIG. 3, the feedback path is organized in two parts 35 and 35' connected between associated separate portions 34"-33" and 34'''-33''' of the output and input registers, as shown, respectively.

The arrangement of FIG. 3 also includes an AND circuit 37, the output of which is connected to portion 33''' of input register 33. First and second inputs to circuit 37 are connected to the phase $\phi_1$ output of a clock circuit (not shown) and, via line 38, to an output of additional latch (AL) of portion 34' of output register 34. A signal on line 38 is operative to inhibit (the clocking) of portion 33''', thus preventing modification of a portion of the input to decoder 31 during A next $\phi_1$ phase of operation. Additional Latch (AL) thus is cooperative with AND circuit 37 to retain the (present state) bits in portions 33''' as a return address while a shared command sequence executes.

FIG. 4 shows a sample state diagram fragment for illustrating the use of the shared command sequence call mechanisms discussed in connection with FIG. 3 for controlling the ALU. The assumption for the illustration is that the PLA of FIG. 3 contains a sequence of three actions (outputs) which are to be performed at three different places in the PLA and that it is desired to make the sequence into a shared subroutine for generating three microcode words. When a shared sequence of outputs (subroutine) is desired, each word line in the sequence has its inhibit output activated. In addition, each word line should have $2^l$ consecutive state numbers assigned to it rather than just one where $l$ is the number of bits in portion 35' of the feedback path in FIG. 3. These states are selected so that the present state output of a word line specifies (0 or 1) values for all the bits of latch 33'' and so that all the bits of latch 33''' are "don't cares". For example, if $k = 5$ and $l = 2$, then the (selected) state set $\{4,5,6,7\}$ is acceptable and is specified as latch 33'' = 001 (binary) latch 33''' = xx (don't cares). This assumes (for illustration purposes) that latch 33'' contains the most significant bits of the state vector.

In FIG. 4, each box represents one word line in ROM 32 of FIG. 3. Arrows between the boxes indicate next state flow. The upper left-hand corner of each box contains the state number(s) associated with that box and the remainder of the box controls the outputs generated if that box is entered. The "subroutine" consists of the second, third and fourth boxes down from the top as viewed. Note that the boxes have states S4-S7, S8-S11 and S12-S15 associated with them, respectively. The various states are selected so that the latch 33''' part of the present state input comprises "don't cares". Boxes not associated with the subroutine need only take up one state number each.

The illustrative sequence is assumed to start when state zero (S0) is entered during a phase $\phi_1$ as shown at the top of FIG. 4. Action 1 is performed in response. That is to say, an output code for action 1 appears at the portion 34' of output register 34 of FIG. 3 during the next phase $\phi_2$. State S4 is specified by latches 33' and 33''' of FIG. 3 and as indicated by line 40 of FIG. 4. The subroutine is entered with latch 33''' set to inhibit a state assumed = 00.

The value of latch 33''' remains unchanged and ignored while the subroutine executes. Actions 2, 3 and 4 are performed sequentially as indicated in blocks 41, 42 and 43 of FIG. 4. The "next state" of block 43 (action 4) specifies S16 as a next state. Latch 33''' is still inhibited as indicated in block 43. Consequently, S16 is the actual next state generated and is defined as the "return" state from the first subroutine call. As is clear from the Figure, action 5 of block 44 is performed next.

Block 44 specifies a next state of S5 and so the subroutine is reentered at the top as indicated by arrow 45. Latch 33''', at this juncture, is set to =01. The subroutine again generates the action 2, action 3, action 4 sequence. In this instance, state S17 is specified as the next state because latch 33''' = 01. This is shown at block 47.

Action 6 is performed and the subroutine is reentered a third time as indicated by arrow 48.

After the subroutine is executed a third time, control returns to state S18 as indicated. Action 7 is performed as indicated by block 49 and operation ceases. The foregoing actions are summarized in the following Table I for convenience:

TABLE I

| | | Actions Taken |
|---|---|---|
| subroutine | 1 | decode "PUSH MULTIPLE" instruction (pre-decrement) |
| | 2 | send sp to ALU input |
| | 3 | subtract 1 from ALU input, put in ALU output |
| | 4 | send ALU output to sp, CPU pins, indicate address valid |
| | 5 | send R0 to pins, write the data |
| subroutine | 2 | |
| | 3 | |
| | 4 | |
| | 6 | send R1 to pins, write the data |
| subroutine | 2 | |
| | 3 | |
| | 4 | |
| | 7 | send R2 to pins, write the data |

The "PUSH MULTIPLE" instruction is operative to push the contents of a (consecutive) set of registers onto the stack.

The associated PLA word lines are summarized in the following Table II:

TABLE II

| In | | Out | |
|---|---|---|---|
| State | Opcode | Next State | Inhibit |
| 00000 | "push multiple" | 00100 | 0 |
| 001XX | X | 01000 | 1 |
| 010XX | X | 01100 | 1 |
| 011XX | X | 10000 | 1 |
| 10000 | X | 00101 | 0 |
| 10001 | X | 00110 | 0 |
| 10010 | X | 10011 | 0 |

This example is illustrative of any set of three subroutine calls. For the present example, 7 word lines are used to implement the 13 cycle sequence as is clear from Table II. If implemented in the classical fashion, 13 word lines would be needed along with one less state bit input and one less output for clock inhibit.

The value of $l$ used in FIG. 3 determines the maximum number of commands which can use any one shared sequence. This maximum number is $2^l$. One may think of the technique described as a way of trading off states for word lines. Since states are much less costly than word lines, (we can double the number of states available by just adding 1 bit to the state vector).

It is highly advantageous to take advantage of this technique whenever possible. Assuming that $l = 2$ (a reasonable figure) and that there are sequences within the PLA that can be shared in this way, we can save at least 1 word line for each 3 additional states used (one state would have been used anyway). The value of $l$ that is used for any particular design depends on the number of times that each subroutine is expected to be called, and the number of state bits required in each case. For a typical PLA which containing say ten commands with three subroutines of length three, twenty-one word lines are saved.

Note that latch 33''' part of the state vector is not used only to hold return addresses. It can serve also as part of the state vector itself for all of the $2^k$ states which are not used in shared sequences. It is thus much more efficient than providing a separate return address latch. The number of bits contained in the state vector (which=k in FIG. 3) may increase over the number which would have been used by the classical approach. The benefits derived by the trade-off would certainly make any additional bits worthwhile.

Note finally the extreme simplicity of the additions included herein when compared to the classical PLA state machine of FIG. 2. All that has been added to the classical PLA state machine is one PLA output, one NOR gate, and (possibly) one or two more bits to the present state vector. In exchange for this, a substantial word line savings is achieved.

What is claimed is:

1. A finite state machine having at least first and second phases of operation, separate input and output means for applying inputs to and for generating outputs from said finite state machine during said first and second phases, respectively, first feedback means connected between said output means and said input means for applying to said input means data representative of a next state of said finite state machine, second feedback means also connected between said output means and said input means for applying to said input means data also representative of a next state of said finite state machine, said finite state machine also including control means responsive to a first signal for inhibiting said second feedback means, thus controllably storing data applied by said second feedback means.

2. A finite state machine in accordance with claim 1 wherein said control means is responsive to a second signal for enabling said second feedback means.

3. A finite state machine having at least first and second phases of operation, input means for applying inputs to said finite state machine during said first phase and output means connected to said machine for generating m≧k output bits during said second phase of operation, first feedback means connected between said output means and said input means for applying to said input means k−1 inputs representative of k−1 of k bits of the next state of said finite state machine, said first feedback means including a k−1 bit latch, second feedback means also connected between said output means and said input means and including an l bit latch for applying to said input means l bits of the next state of said finite state machine, said finite state machine also including means for inhibiting said second feedback means from applying inputs to said input means.

4. A finite state machine in accordance with claim 3 comprising a programmed logic array.

5. A finite state machine in accordance with claim 3 wherein said means for inhibiting includes an AND gate responsive to an inhibit output from said output means during said second phase for inhibiting said second feedback means.

6. A finite state machine in accordance with claim 4 wherein said means for inhibiting includes an AND gate responsive to an inhibit output from said output means during said second phase for inhibiting said second feedback means.

7. A finite state machine in accordance with claim 3 in combination with a data path comprising m−k elements and means connected to said output means for applying m−k bits to said elements.

8. A microprocessor chip including a finite state machine having at least first and second phases of operation, input means for applying inputs to said finite state machine during said first phase and output means connected to said machine for generating m≧k output bits during said second phase of operation, first feedback means connected between said output means and said input means for applying to said input means k−1 inputs representative of k−1 of k bits of the present state of said finite state machine, said first feedback means including a k−1 bit latch, second feedback means also connected between said output means and said input means and including an l bit latch for applying to said input means l<k of k bits of the present state of said finite state machine, said microprocessor chip also including means for inhibiting said second feedback means from applying inputs to said input means.

* * * * *